United States Patent [19]

Hiller

[11] 4,239,750
[45] Dec. 16, 1980

[54] ANIMAL FEEDS CONTAINING A MIXTURE OF LINCOMYCIN OR OLEANDOMYCIN AND PROTEOLYTIC ENZYMES

[75] Inventor: Günter Hiller, Erkrath, Fed. Rep. of Germany

[73] Assignee: Henkel Kommanditgesellschaft auf Aktien (Henkel KGaA), Dusseldorf-Holthausen, Fed. Rep. of Germany

[21] Appl. No.: 4,281

[22] Filed: Jan. 17, 1979

[30] Foreign Application Priority Data

Jan. 20, 1978 [DE] Fed. Rep. of Germany ....... 2802398

[51] Int. Cl.³ ........................ A23K 1/17; A23K 1/165
[52] U.S. Cl. .................................... 424/94; 424/177; 426/2; 426/53; 426/623; 426/630; 426/807
[58] Field of Search .................. 426/2, 72.43, 53, 623, 426/630, 635, 807; 424/94, 177

[56] References Cited

U.S. PATENT DOCUMENTS 3,455,696  7/1969  Ukita et al. .............................. 426/31
4,062,732  12/1977  Lehmann et al. ....................... 426/53

OTHER PUBLICATIONS

The Merck Index 8th Edition Stecher (Editor) Merck & Co Publishers 1968 pp. 620 and 763.
Goldberg "Antibiotics' Their Chemistry & Non Medical Uses" Van Nostrand & Co Publishers pp. 174–183.

Primary Examiner—R. B. Penland
Attorney, Agent, or Firm—Hammond & Littell, Weissenberger and Muserlian

[57] ABSTRACT

Animal feeds based on carbohydrates, protein and fats containing from 1 to 250 ppm of one of the antibiotics lincomycin or oleandomycin and a content of proteolytic enzymes in such an amount that the enzymatic activity is from 0.05 to 2.5 mTU/gm of said animal feed.

12 Claims, No Drawings

ANIMAL FEEDS CONTAINING A MIXTURE OF LINCOMYCIN OR OLEANDOMYCIN AND PROTEOLYTIC ENZYMES

BACKGROUND ART

High potency animal feeds, as they are normally used today in intensive animal raising, contain a number of additives of prophylactic and/or nutritive effect. These include among others antibiotics and enzymes. While the use of antibiotics has found acceptance in mixed feeds of all kinds, enzymes are not as yet used on a large scale in the field.

The feed mixtures used in modern intensive animal raising programs are generally optimized in all nutrient components to the extent that further improvement does not seem readily possibile.

Thus, U.S. Pat. No. 3,017,272 suggests the use of from 1 to 200 ppm of Virginiamycin in feeds; U.S. Pat. No. 2,809,892 suggests the use of from 1 to 25 ppm of zinc Bacitracin in feeds; U.S. Pat. No. 4,062,732 suggests the use of certain acid proteases in feed, and U.S. Pat. No. 3,455,696 suggests the use of procaine penicillin, dehydrostreptomycin or tetracycline and an acid protease in feeds.

OBJECTS OF THE INVENTION

An object of the present invention is the development of a mixture of antibiotics and enzymes which will improve the present efficiency of animal feeds.

Another object of the present invention is the development of a high efficiency animal feed based on carbohydrates, protein and fats and containing from 1 to 250 ppm of one of the antibiotics lincomycin or oleandomycin and a content of proteolytic enzymes in such an amount that the enzymatic activity is from 0.05 to 2.5 mTU/gm of said animal feed.

These and other objects of the invention will become more apparent as the description thereof proceeds.

DESCRIPTION OF THE INVENTION

It has been surprisingly found that even optimally composed high-potency (high efficiency) feeds can be further improved with respect to feed utilization and/or the weight gain attainable therewith by adding to these feeds certain antibiotics together with proteolytic enzymes.

The subject of the invention, accordingly, is an animal feed mixture based on carbohydrates, protein, and fats and optionally the customary additives, characterized by a content of 1 to 250 ppm of one of the antibiotics lincomycin or oleandomycin, and a quantity of proteolytic enzymes such that an enzymatic activity of 0.05 to 2.5 mTU/gm is present.

More particularly, the present invention relates to a high efficiency animal feed based on carbohydrates, protein and fats and containing from 1 to 250 ppm of an antibiotic selected from the group consisting of lincomycin and oleandomycin, and a content of proteolytic enzymes in such an amount that the enzymatic activity is from 0.05 to 2.5 mTU/gm of said animal feed; as well as a method for efficient rearing of animals comprising feeding animals a high efficiency animal feed based on carbohydrates, protein and fats and containing from 1 to 250 ppm of an antibiotic selected from the group consisting of lincomycin and oleandomycin, and a content of proteolytic enzymes in such an amount that the enzymatic activity is from 0.05 to 2.5 mTU/gm of said animal feed.

The antibiotic lincomycin belongs to the group of carbohydrate antibiotics and is obtained in known manner by the fermentation of strains of Actinomycetes, e.g. *Streptomyces lincolnensis* var. lincolnensis. The antibiotic is present as a free base or as the hydrochloride. The overall empirical formula of the hydrochloride is $$C_{18}H_{34}N_2O_6S \cdot HCl \cdot H_2O.$$

The antibiotic oleandomycin belongs to the group of macrolid antibiotics and is isolated in known manner from cultures of *Streptomyces antibioticus*. The overall formula for the base is $C_{35}H_{61}O_{12}N$. Other compounds derived from it may also be used as feed additives, e.g. its salts, esters or complexes or an absorbate form of the oleandomycius.

Suitable proteolytic enzymes to be employed according to the invention are obtained above all by culturing microorganisms and separation of the enzymes produced from the culture solutions. The processes for this are known. Proteolytic enzymes can be used as produced, for example, from *Bacillus licheniformis, Bacillus natta, Bacillus subtilis*, etc. Especially preferred are acid proteases, e.g., from *Aspergillus niger* or those described in U.S. Pat. Nos. 3,674,644 and 3,677,898. Acid proteases from the genus Tramates or from *Rhizopus rhizopodiformis* according to U.S. patent application Ser. No. 695,453, filed June 14, 1976, and now U.S. Pat. No. 4,062,732, are particularly preferred. Such proteases have a particularly wide spectrum of action in the weakly acid range between pH 2.5 and 6.5. These acid proteases preferably have a pH range of 50% of maximum activity of between a pH of 2.5 and a pH of 6.5.

Commercial feed mixtures are optimally composed for the special needs of the various animal species. They are customarily based on carbohydrates, proteins and fats with optional customary feed supplements or additives. The carbohydrates are chiefly from cereal components, corn or the like. The protein carriers are primarily extracted soybean meal pellets, fish meal, animal body meal, bran and the like. Essential amino acids which are lacking, for example, methionine, can be added. The fats are employed in the form of plant or animal fats or added in the form of waste fats. For body building, there are added further salts, such as dicalcium phosphate, calcium carbonate, and common salt. Optionally, the feed mix is balanced by the addition of trace elements, vitamins, ballast substances, etc. Also substances produced fermentatively, such as single cell proteins from petroleum fractions or alcohols, various yeasts, algae proteins or others, possibly also substances recovered from waste materials, may be a component part of the feed formulation, in part to a considerable degree.

The animal feed mixtures of the invention contain in addition to the usual components adapted for certain animal species or feed use, additionally 1 to 250 ppm, preferably 5.0 to 50 ppm of the mentioned lincomycin or oleandomycin, depending on the age of the animal and the type of feed, and the proteolytic enzymes in a quantity such that the enzymatic activity is from 0.05 to 2.5 mTU/gm, preferably 0.2 to 0.5 mTU/gm. Preferably lincomycin is employed in amounts of from 10 to 100 ppm depending upon the feed program and the type of animal and oleandomycin is employed in amounts of 5.0 to 80 ppm depending upon the feed program and type of animal. In particular, a combination of the antibiotics and an acid fungus protease or respectively protease mixture is employed.

The above-mentioned concentrations of additives are based on the whole animal feed. In concentrates or feed supplements, the concentrations are correspondingly higher, in particular, a combination of one of the above-mentioned antibiotics and an acid fungus protease or protease mixture is used. The growth increase or improvement in food utilization thereby obtained compared with appropriate control mixtures containing antibiotics alone amounts to several percent.

The combination according to the invention of lincomycin or oleandomycin and enzymes is found to be particularly successful when used in feeds for fowl, for rearing piglets and for fattening pigs but it may also be used in feed mixtures for other types of animals for which one of the antibiotics used alone is also advantageous.

The antibiotic is expediently added to the feed in the form of a premix, for example, combined with extracted soybean meal pellets. When using mixed meal type feed compositions, the enzyme component is also applied as a premix. Here, as carrier substance, any feed component can be used, for example again, extracted soybean meal pellets.

When employing steam-tempered pelletizing of animal feeds, the admixture of the enzymes must occur in suitable stabilized form, to prevent deactivation by moisture and heat during the pelletizing. Such a method is the subject, for example, of U.S. patent application Ser. No. 760,358, filed Jan. 19, 1977 now abandoned.

To determine the enzymatic activity of the enzyme unit (TU), the proteolytic activity of the protease is ascertained by the known principle of Anson. A suitable diluted quantity of enzyme solution is incubated for twenty minutes at 40° C. with an equal volume of a 1.2% casein solution, the latter containing 0.6% lactic acid, 6 mols of urea and 0.1 mol of citric or acetic acid. The pH value of the casein solution is adjusted to 4.5 by addition of 2 N sodium hydroxide solution. After the incubation, the procedure is to admix with 0.4 N trichloroacetic acid in the volumetric ratio 1:1. The forming precipitate of undigested casein is filtered, and the protein cleavage products formed during degradation are ascertained in the filtrate by any method of protein determination. Suitable for this is, for example, the method described by Layne in Method of Enzymology 3 (1957), pages 448 ff.

For each test sample a blank value must be produced, wherein first trichloroacetic acid and then casein solution is added. This blank value indicates, in addition to the reagent blank value, the proportion of peptides of low molecular weight already present before the digestion in the enzyme solution. The difference between main and blank value is then compared, following the indicated method, with the extinction, which is given by a predetermined amount of tyrosine. This amount of tyrosine is then a measure of the proteolytic activity of the enzyme being determined. One enzyme unit (TU) is that amount of enzyme which releases in one minute from the casein solution the cleavage products which have the same extinction value as a 1 M tyrosine solution. It is customary to express this in mTU = $10^{-3}$ TU.

The following examples are illustrative of the invention without being limitative in any respect.

EXAMPLE 1

450 One day old chicks to be reared for fattening, sorted into their sexes ♂, ♀, (1:1), of Ross origin, were raised in cages for 4 weeks on feed mixtures which all had basically the same composition but differed from each other as follows:
(a) without the addition of antibiotics or enzyme,
(b) with the addition of 20 ppm of linomycin,
(c) with the addition of 20 ppm of linomycin and 0.35 mTU/gm of feedstuff of acid protease from *Aspergillus niger* and *Rhizopus rhizopodiformis*,
(d) with the addition of 10 ppm of oleandomycin and
(e) with the addition of 10 ppm of oleandomycin and 0.6 mTU/gm of feedstuff of acid protease from *Rhizopus rhizopodiformis*.

At the end of the experiment, the animals were weighed and their feed utilization determined. The "feed utilization" is the ratio of food consumption to the weight gain.

| Feed Composition (%): | |
|---|---|
| Corn | 49.10 |
| Extracted soybean meal pellets | 36.00 |
| Zein | 4.00 |
| Soybean oil | 5.65 |
| Feed grade dicalcium phosphate | 2.15 |
| Feed grade calcium carbonate | 0.15 |
| Vitamin and mineral premix | 1.85 |
| Sodium chloride | 0.35 |
| DL-methionine | 0.10 |
| | 100.00 |

Results:

| | (a) without additive | (b) with lincomycin | (c) with lincomycin + enzyme |
|---|---|---|---|
| Weight increase | 748 gm | 762 gm | 781 gm |
| Feed utilization | 1.57 | 1.57 | 1.52 |
| | (a) without additive | (d) with oleandomycin | (e) with oleandomycin + enzyme |
| Weight increase | 748 gm | 755 gm | 771 gm |
| Feed utilization | 1.57 | 1.54 | 1.52 |

EXAMPLE 2

240 piglets weighing from 10 to 25 kg were fed on growth foods of identical composition but with the following variations:
(a) without addition of antibiotics or enzyme,
(b) with the addition of 80 ppm of lincomycin,
(c) with the addition of 80 ppm of lincomycin and 0.45 mTU/gm of feed of acid proteases from *Aspergillus niger*,
(d) with the addition of 50 ppm of oleandomycin and
(e) with the addition of 50 ppm of oleandomycin and 0.35 mTU/gm of feed of acid proteases from *Rhizopus rhizopodiformis*.

The animals were kept in flat decks in groups of 8 and fed ad libidum. The progress in growth and the feed utilization were checked by regular weighings. The "feed utilization" is the ratio of food consumption to weight increase.

| Feed Composition (%): | |
|---|---|
| Wheat | 38.0 |
| Oatmeal | 20.0 |

| -continued | | | |
|---|---|---|---|
| Wheat bran | | | 9.9 |
| Fine soybean meal | | | 16.4 |
| Malt germ | | | 5.0 |
| Fat | | | 3.0 |
| Cornstarch/dextrose | | | 4.0 |
| Minerals, vitamins | | | 3.7 |
| | | | 100.0 |
| Results: | | | |
| | (a) | (b) | (c) |
| | without additive | with lincomycin | with lincomycin + enzyme |
| Average daily weight increase | 486 gm | 515 gm | 528 gm |
| Feed utilization | 2.22 | 2.20 | 2.18 |
| | (a) | (d) | (e) |
| | without additive | with oleandomycin | with oleandomycin & enzyme |
| Average daily weight increase | 486 gm | 492 gm | 509 gm |
| Feed utilization | 2.22 | 2.12 | 2.07 |

The preceding examples clearly demonstrate that the presence of both the antibiotics lincomycin or oleandomycin and proteolytic enzymes, preferably acid proteases, increase both the end weight and feed utilization ratio in chick and piglet raising. Comparable results are obtained with feed for laying hens.

The preceding specific embodiments are illustrative of the practice of the invention. It is to be understood, however, that other expedients known to those skilled in the art or disclosed herein, may be employed without departing from the spirit of the invention or the scope of the appended claims.

I claim:

1. A high efficiency animal feed for chickens and pigs comprising carbohydrates, protein and fats and containing from 1 to 250 ppm of an antibiotic selected from the group consisting of lincomycin and oleandomycin, and a content of acid proteolytic enzymes with a wide spectrum of activity in the range of between a pH of 2.5 and 6.5 in such an amount that the enzymatic activity is from 0.05 to 2.5 mTU/gm of said animal feed.

2. The animal feed of claim 1 wherein said acid protease has a pH range of 50% of maximum activity of between a pH of 2.5 and a pH of 6.5.

3. The animal feed of claim 1 wherein said antibiotic is present in an amount of from 5.0 to 50 ppm.

4. The animal feed of claim 1 wherein said enzymatic activity is from 0.2 to 0.5 mTU/gm of said animal feed.

5. The animal feed of claim 1 wherein said antibiotic is lincomycin present in an amount of 10.0 to 100 ppm.

6. The animal feed of claim 1 wherein said antibiotic is oleandomycin present in an amount of 5.0 to 80 ppm.

7. A method for efficient rearing of chickens and pigs comprising feeding said animals a high efficiency animal feed comprising carbohydrates, protein and fats and containing from 1 to 250 ppm of an antibiotic selected from the group consisting of lincomycin and oleandomycin, and a content of acid proteolytic enzymes having a wide spectrum of activity in the range of between a pH of 2.5 and 6.5 in such an amount that the enzymatic activity is from 0.05 to 2.5 mTU/gm of said animal feed.

8. The method of claim 7 wherein said acid protease has a pH range of 50% of maximum activity of between a pH of 2.5 and a pH of 6.5.

9. The method of claim 7 wherein said antibiotic is present in an amount of from 5.0 to 50 ppm.

10. The method of claim 7 wherein said enzymatic activity is from 0.2 to 0.5 mTU/gm of said animal feed.

11. The method of claim 7 wherein said antibiotic is lincomycin present in an amount of 10.0 to 100 ppm.

12. The method of claim 7 wherein said antibiotic is oleandomycin present in an amount of 5.0 to 80 ppm.

* * * * *